United States Patent [19]

Bennett

[11] 4,213,641
[45] Jul. 22, 1980

[54] FILAMENT WOUND PIPE COUPLING

[75] Inventor: Joe B. Bennett, Conroe, Tex.

[73] Assignee: Owens-Corning Fiberglas Corporation, Toledo, Ohio

[21] Appl. No.: 865,561

[22] Filed: Dec. 29, 1977

[51] Int. Cl.² ................. F16L 21/02; F16L 47/00
[52] U.S. Cl. ................................. 285/369; 156/173; 156/425; 285/383; 285/423
[58] Field of Search .............. 285/369, 423, 230, 235, 285/383; 156/173

[56] References Cited

U.S. PATENT DOCUMENTS

| 2,751,237 | 6/1956  | Conley   | 285/423 X |
| 2,878,038 | 3/1959  | Noland   | 285/423 X |
| 3,179,445 | 4/1965  | Moretti  | 285/369 X |
| 3,575,445 | 4/1971  | French   | 285/369 X |
| 3,623,930 | 11/1971 | Grosh    | 156/173 X |
| 3,733,233 | 5/1973  | Griffiths| 156/173 X |
| 3,765,979 | 10/1973 | Thomas   | 285/423 X |
| 4,106,797 | 8/1978  | Michael  | 285/423 X |

FOREIGN PATENT DOCUMENTS

| 1207150 | 8/1959 | France         | 285/423 |
| 1320685 | 6/1973 | United Kingdom | 285/423 |
| 1365151 | 8/1974 | United Kingdom | 285/423 |

Primary Examiner—Thomas F. Callaghan
Attorney, Agent, or Firm—Ronald C. Hudgens; Patrick P. Pacella; Paul J. Rose

[57] ABSTRACT

The pipe coupling includes a hollow cylindrical body and pipe registering means projecting radially inward therefrom centrally thereof. The body has a pair of inner annular grooves respectively adjacent opposite ends for the reception of sealing rings. Both the body and the pipe registering means are formed of glass fiber reinforced thermosetting resin and each contains glass filament windings. A plastic film strip between the body and the pipe registering means maintains them separate as the resin of both is cured. Thereafter, any cracking of the pipe registering means will leave the body intact and a good pipe joint will be maintained.

5 Claims, 8 Drawing Figures

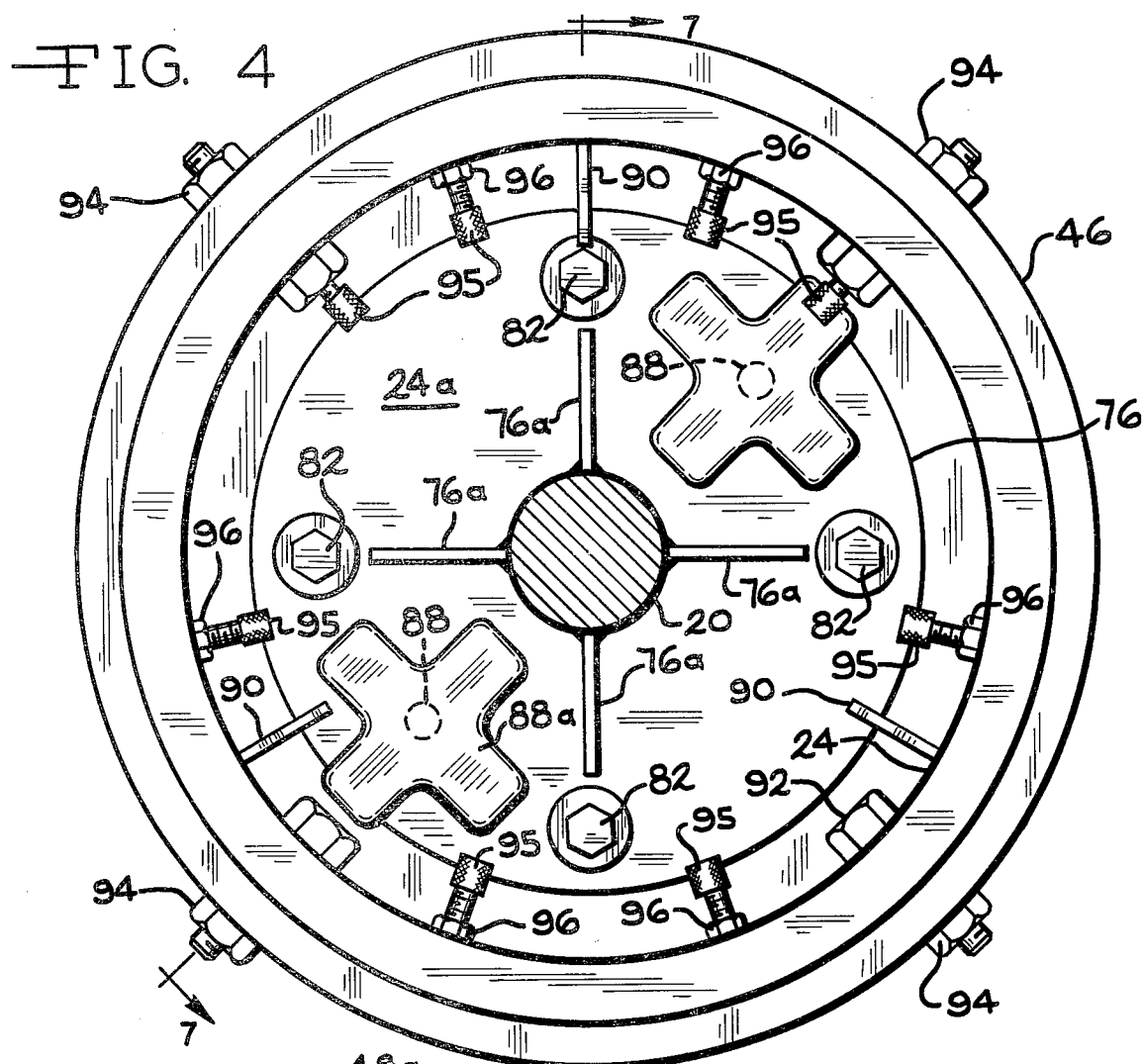
FIG. 4
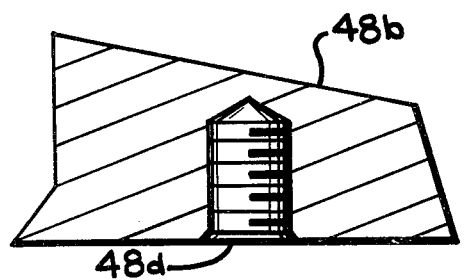
FIG. 6
FIG. 5

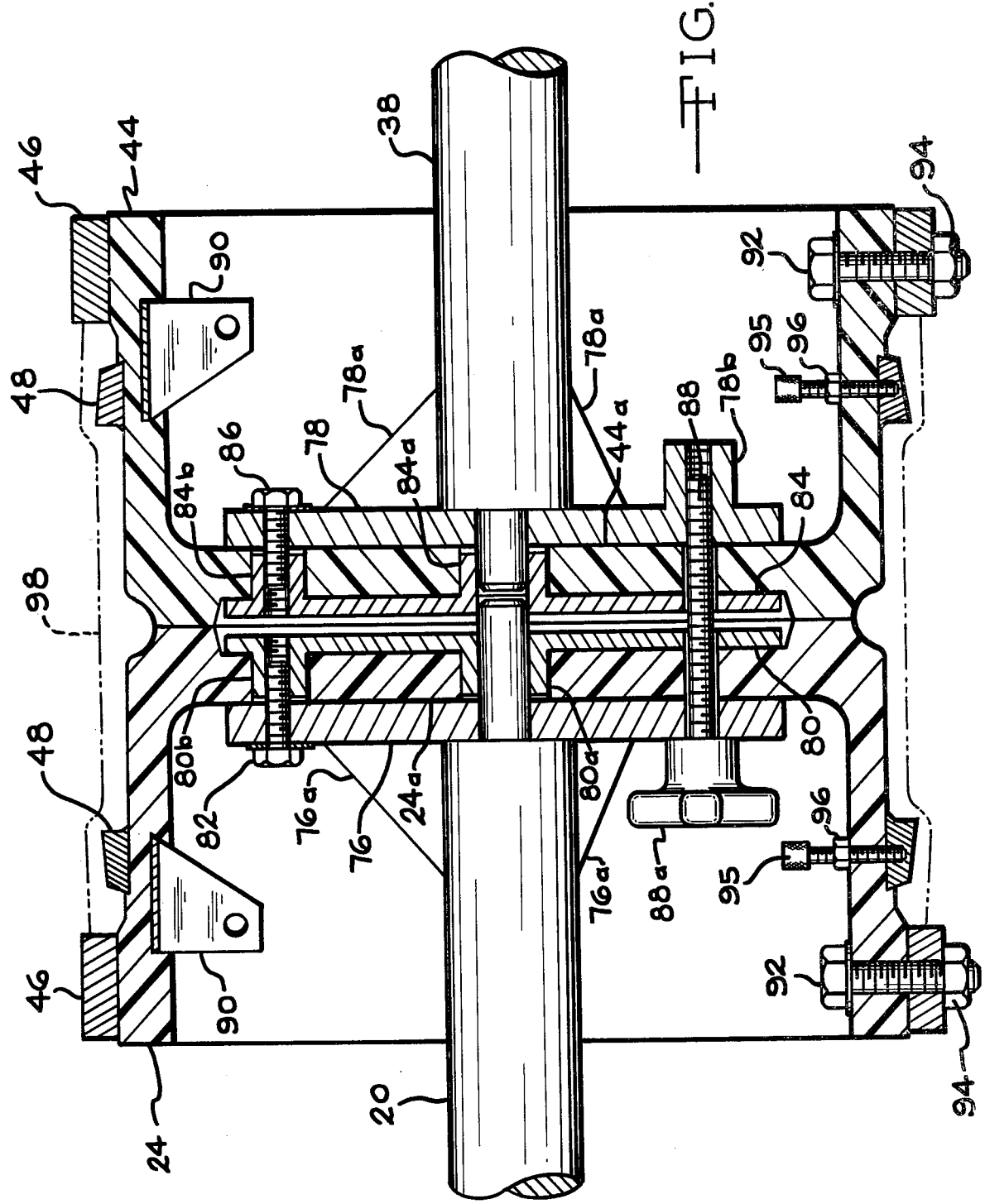

FILAMENT WOUND PIPE COUPLING

This invention relates generally to pipe couplings, and more particularly to a filament wound glass fiber reinforced thermosetting resin pipe coupling for pipes of relatively large diameter.

Other objects will become apparent when the following specification is considered along with the accompanying drawings in which:

FIG. 4 is a sectional view taken along the line 4—4 of FIG. 3;

FIG. 5 is a view of one of the segmented groove mold rings removably securable to a mold half;

FIG. 6 is an enlarged sectional view taken along the line 6—6 of FIG. 5;

FIG. 7 is a partially rotated sectional view taken along the line 7—7 of FIG. 4.

Figure 1:
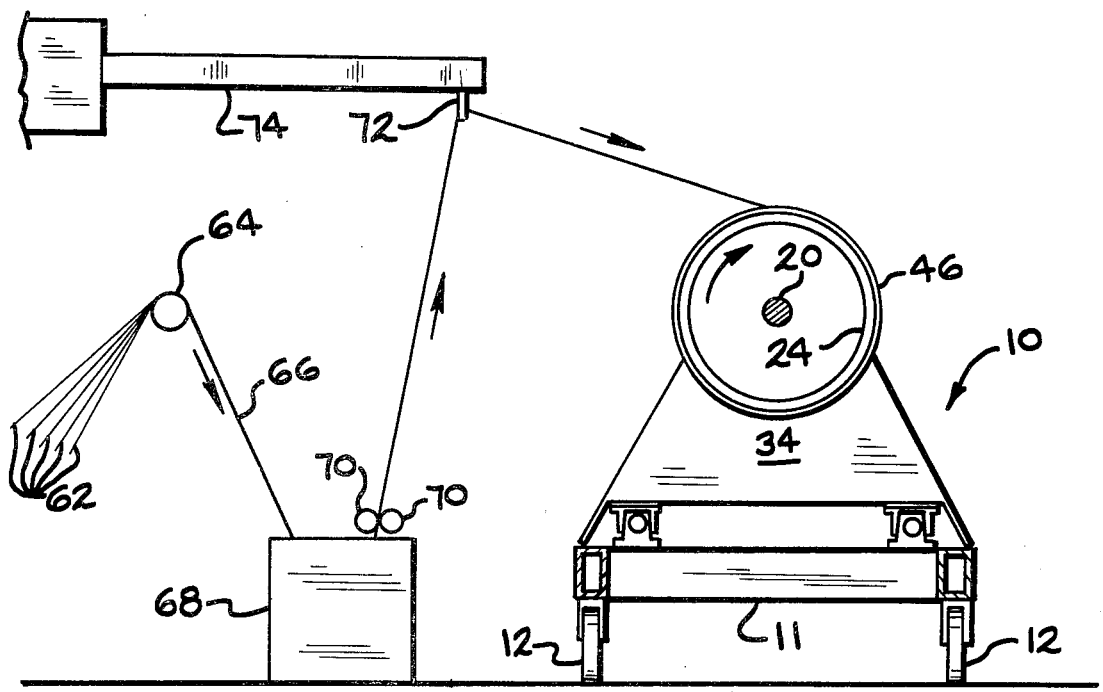
FIG. 1 is a schematic end elevational view, with portions cut away, of a cart and rotatable mold constructed in accordance with the invention and located at a filament winding station.
Figure 2:
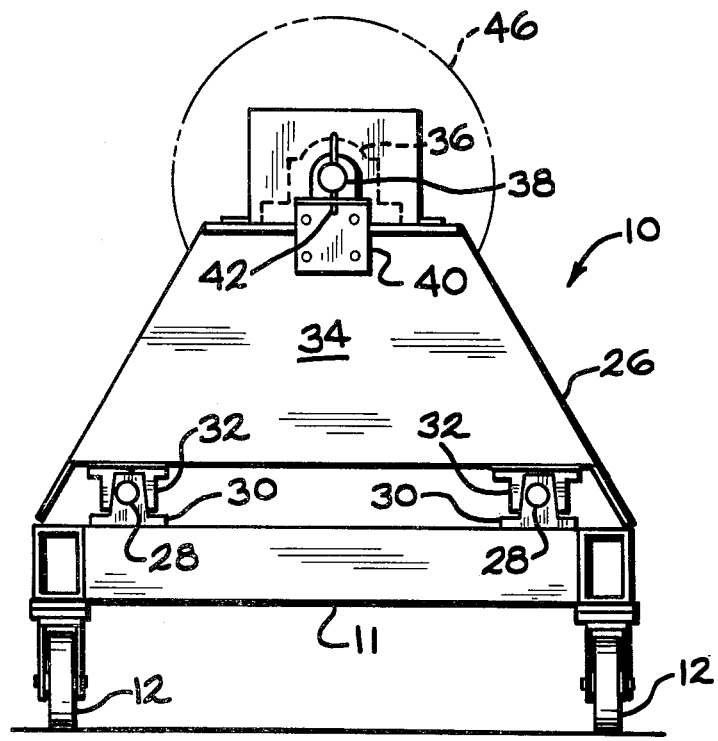
FIG. 2 is an end elevational view of a cart constructed in accordance with the invention, before installation of the mold halves thereon, looking at the opposite end thereof from that at which it is connectable to a shaft driving mechanism.
Figure 3:
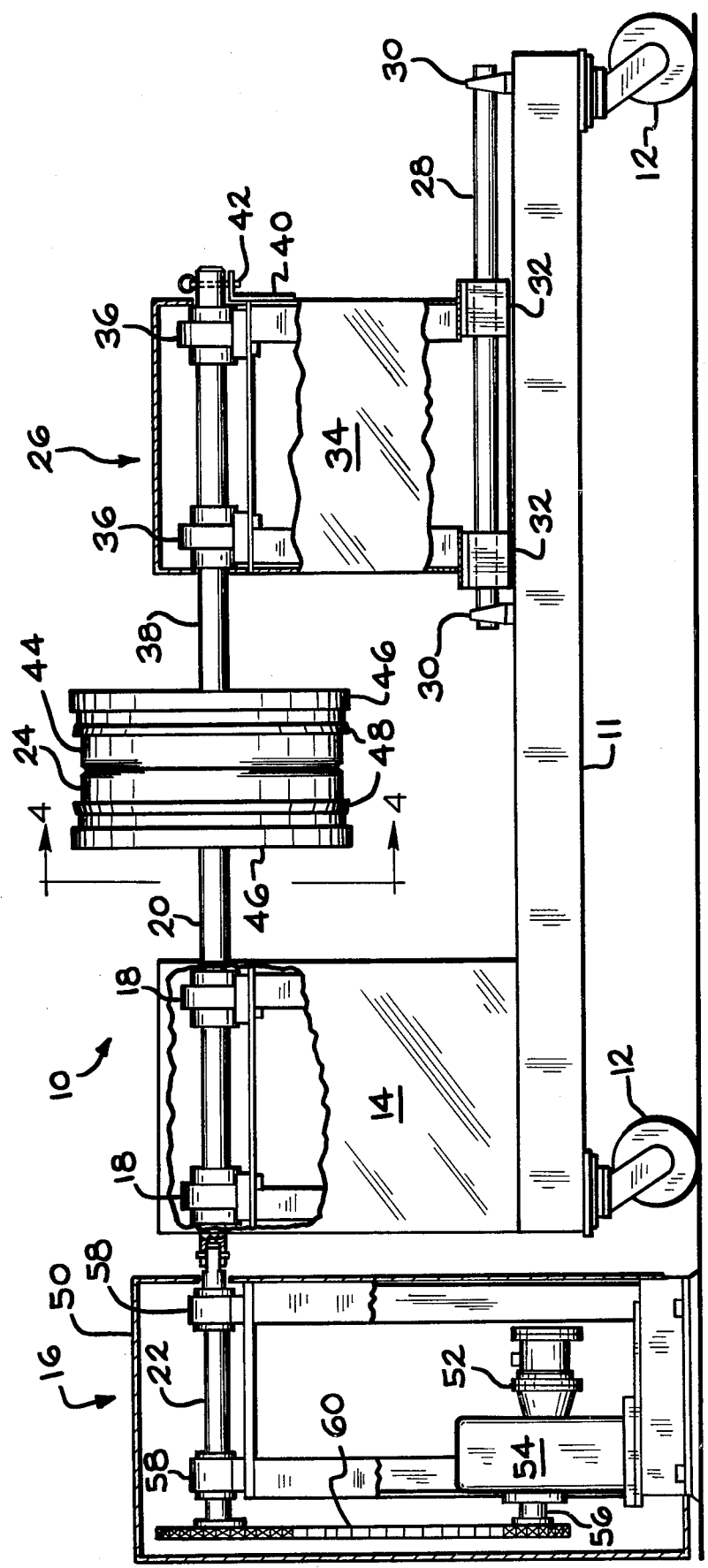
FIG. 3 is a side elevational view, partially in section, taken from the left-hand side of FIG. 2 and showing the shaft driving mechanism at the filament winding station, and the mold halves installed.

With respect to the drawings, a cart 10 for making pipe couplings constructed in accordance with the invention is shown in FIGS. 1 to 3. The cart 10 includes a frame 11 supported by four caster wheels 12. As shown in FIG. 3, a housing 14 is mounted at an end of the frame 11 adjacent a drive mechanism 16. Within the housing 14 two spaced aligned bearings 18 are mounted on upper portions of suitable framework. A drive shaft 20 is rotatably mounted in the bearings 18 and extends through the housing 14. An end portion of the shaft 20 adjacent the drive mechanism 16 is connectable to a drive shaft 22 of the mechanism 16, and the other end portion of the shaft 20 has a generally cylindrical mold half 24 mounted thereon.

Adjacent the other end of the frame 11 a carriage 26 is reciprocably mounted on a pair of guide rods 28 each mounted respectively adjacent opposite ends in a pair of mounting blocks 30 secured to the frame 11. Each rod 28 has a pair of spaced bushing blocks 32 reciprocably mounted thereon and secured to lower portions of suitable framework of the carriage 26 within a housing 34 thereof. Two spaced aligned bearings 36 are mounted on upper portions of the framework of the carriage 26. A driven shaft 38 is rotatably mounted in the bearings 36 and extends through the housing 34. A locking bracket 40 is secured to the end of the housing 34 farthest from the housing 14. A locking pin 42 is insertable through one end portion of the shaft 38 and through a flange of the bracket 40 when it is desired to prevent the shaft 38 from rotating at times when the drive shaft 20 is not connected to the drive shaft 22 of the driving mechanism 16. A generally cylindrical mold half 44 is mounted on the other end portion of the shaft 38. Each of the mold halves 24 and 44 has a push ring 46 removably secured thereto on its outer periphery at an end portion thereof remote from the other mold half. Further, each mold half has a segmented groove mold ring 48 removably secured thereto on its outer periphery generally centrally thereof.

The drive mechanism 16 includes a housing 50 and suitable framework therein for mounting a motor 52, gear reducing mechanism 54 having an output shaft 56, and a pair of spaced aligned bearings 58 for the drive shaft 22. The shafts 22 and 56 are operatively connected by an endless belt or chain 60 and suitable pulleys or sprockets.

When the drive shaft 20 of the cart 10 is connected to the drive shaft 22 of the drive mechanism 16 and the mold halves 24 and 44 are secured together, energization of the motor 52 rotates the mold halves for a filament winding process as schematically illustrated in FIG. 1 where a plurality of strands 62 of continuous glass filaments are fed over a pulley 64, gathered into a single strand 66, fed into a bucket 68 containing liquid resin, under a roller (not shown) in the bucket, out of the bucket and between a pair of rolls 70 for squeezing off excess resin, through a guide eye 72 mounted on an arm 74, and around the rotating mold halves 22 and 24. The arm 74 is movable in a controlled pattern axially of the shafts 20 and 38, by control mechanism not shown, to build up a filament wound glass fiber reinforced thermosetting resin pipe coupling on the mold halves 22 and 24.

FIG. 4 shows the mold half 24 and FIG. 7 shows the mold halves 24 and 44 joined together. A cast mounting plate 76 having four gussets 76a spaced ninety degrees from each other is mounted on a reduced end portion of the shaft 20 and rigidly secured to the full diameter portion thereof by the welding of the gussets 76a thereto. A similar mounting plate 78 having gussets 78a is similarly mounted on the end portion of the shaft 38. The generally cylindrical mold halves 24 and 44 are closed at one end. A flat mounting portion 24a of the mold half 24 is clamped between the mounting plate 76 and a clamping plate 80 having an apertured central boss 80a mounted on the reduced end portion of the shaft 20 and having four drilled and tapped bosses 80b spaced ninety degrees apart from each other and recessed in the portion 24a. Four bolts 82 are threaded respectively into the bosses 80b to clamp the portion 24a between the plates 76 and 80. Similarly, a flat mounting portion 44a of the mold half 44 is clamped between the mounting plate 78 and a clamping plate 84 having an apertured central boss 84a mounted on the reduced end portion of the shaft 38 and having four drilled and tapped bosses 84b spaced ninety degrees apart from each other and recessed in the portion 44a. Four bolts 86 are threaded respectively into the bosses 84b to clamp the portion 44a between the plates 78 and 84.

The plate 78 is provided on an outer side with a pair of drilled and tapped bosses 78b spaced one hundred eighty degrees apart. Two studs 88 each provided with a hand knob 88a are threaded respectively into the bosses 78b to secure the mold halves 24 and 44 together.

The cylindrical portion of each of the mold halves 24 and 44 is provided on the inside with three anchoring lugs 90 spaced one hundred twenty degrees apart, for the purpose of removing a formed pipe coupling from the mold halves as later explained.

The push ring 46 of each mold half is removably secured on the outer periphery thereof and adjacent the open end thereof by four bolts 92 spaced ninety degrees apart and provided respectively with nuts 94.

One of the segmented groove mold rings 48 is shown in FIG. 5 and includes a short segment 48a and two larger segments 48b and 48c. The end faces of the segment 48a lie in parallel planes, enabling the segment 48a to be removed by being pulled radially inwardly. The segment 48a is provided on its inner periphery with two spaced tapped blind holes 48d and each of the segments 48b and 48c is provided with three such holes, one of which is best shown in FIG. 6. The ring segments are secured to the outer peripheries of the mold halves 24 and 44 by knurled-head screws 95 threaded respectively into the holes 48d and provided with lock nuts 96.

Figure 8:
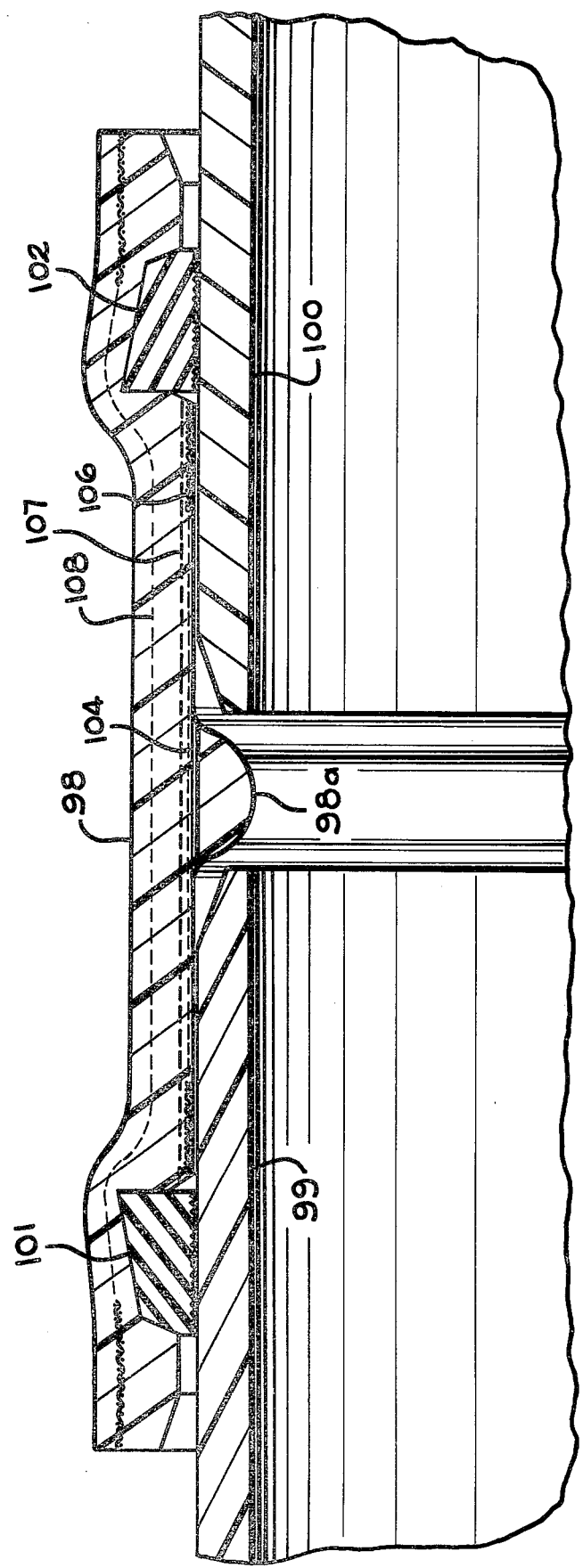
FIG. 8 is a fragmentary longitudinal sectional view through a pipe joint having a coupling constructed in accordance with the invention.

A pipe coupling 98 constructed in accordance with the invention is shown in FIG. 8 in use with two pipes 99 and 100. Sealing rings 101 and 102 of elastomeric material are provided in the grooves formed in the coupling 98 by the groove mold rings 48. The coupling 98 includes a pipe registering means or center register portion 98a only partially bonded to the rest of the coupling due to the presence of a plastic film strip 104. A surface mat 106 and a non-woven mat 107 are provided adjacent the inner surface of the coupling 98 between the sealing rings 101 and 102. Further, a mat 108 of woven glass fiber roving is provided in the coupling 98 intermediately of the wall thickness and extending substantially the full width of the coupling 98. The remainder of the coupling 98 is resin and glass filament windings.

With the mold halves 24 and 44 secured together by the studs 88, the push rings 46 and groove mold rings 48 secured in position, the locking pin 42 removed from the shaft 38, and the shaft 20 connected to the shaft 22, preferably by a universal joint, isothalic resin impregnated continuous glass filaments are wound into the groove at the junction of the mold halves to form the center register portion 98a of the pipe coupling 98. An operator then manually winds the plastic film strip 104, previously cut to length, over the filled groove. Next, he winds the surface mat 106 and the non-woven mat 107 on the mold halves, the mats having been previously cut to length and saturated with bisphenol resin. Continuous glass filaments, impregnated with isothalic resin from the bucket 68, are wound over the mat 107 and rings 48 and the portions of the mold halves between the rings 48 and the push rings 46 in a controlled pattern to build up the coupling 98 about half way. Then the woven roving mat 108, previously cut to length but without resin impregnation, is wound on the half-formed coupling. Finally, continuous glass filaments, impregnated with isothalic resin, are wound over the mat 108 in a controlled pattern to complete the forming of the coupling 98. The shafts 20 and 22 are then disconnected and the cart 10 is moved from the filament winding station to a curing station at which an electric heater cures the resin of the coupling. The cart 10 is then moved to a product removal station wherein a cylinder of a pneumatic actuator (not shown) is pinned first to one of the anchor lugs 90 of the mold half 44. The studs 88 securing the mold halves together are removed, and the screws 95 and bolts 92 are removed from both mold halves. A piston of the pneumatic actuator is then forced against the push ring 46 on the mold half 44 to pull the mold half 44 from the coupling 98 as the carriage 26 retracts along the guide rods 28. The cylinder of the pneumatic actuator is then pinned to one of the anchor lugs 90 of the mold half 24 and the piston is forced against the push ring 46 on the mold half 24 to move the push ring and the coupling 98 along the mold 24 to loosen the coupling. The coupling 98 is then removed from the cart 10 and the screws 95 are threaded back into the ring segments 48a, 48b, and 48c. By prying against the heads of the screws 95, the ring segments 48a are removed from the coupling, after which the segments 48b and segments 48c are more easily removed. The ring segments are then reassembled on the mold halves 24 and 44 along with the push rings 46 and the mold halves are secured together again by the studs 88 with the knobs 88a. The cart 10 may then be moved back to the winding station and the shafts 20 and 22 connected for the production of another coupling 98.

The film strip 104 prevents the center register portion 98a from fully bonding to the rest of the coupling. Then if cracking of the center register portion 98a happens to occur, the remainder of the coupling will be intact and a good joint will be provided.

It would be within the scope of the invention to replace the segmented groove mold rings 48 with one-piece rings, of elastomeric material, which would not have to be held in place on the mold halves 24 and 44 by screws 95.

Various other modifications of the coupling, apparatus, and method shown and described may be made without departing from the spirit and scope of the invention.

I claim:

1. A pipe coupling comprising a generally cylindrical, hollow, glass fiber reinforced thermosetting resin body and a glass fiber reinforced thermosetting resin pipe registering means projecting radially inwardly from the body substantially midway between opposite end faces thereof, the body and the pipe registering means each containing glass filament windings, the body having a pair of inner annular grooves respectively adjacent the opposite end faces for the reception of sealing rings, the body having been formed around the pipe registering means immediately after the forming of the pipe registering means and cured simultaneously therewith, and the pipe registering means being separate from but substantially contiguous with the body.

2. A pipe coupling as claimed in claim 1 including a plastic film strip disposed between the pipe registering means and the body for maintaining the pipe registering means separate from the body as the thermosetting resin of both is cured.

3. A pipe coupling as claimed in claim 1 including a surfacing mat within the body adjacent an inner surface thereof.

4. A pipe coupling as claimed in claim 3 including a non-woven mat within the body and surrounding the surfacing mat.

5. A pipe coupling as claimed in claim 4 including a mat of woven glass roving adjacent the midpoint of the wall thickness of the body and extending substantially the length of the body.

* * * * *